United States Patent
Wang et al.

(10) Patent No.: US 9,351,101 B2
(45) Date of Patent: May 24, 2016

(54) COMMUNICATION METHOD AND APPARATUS FOR NFC DEVICE AND NFC DEVICE

(71) Applicant: Huawei Device Co., Ltd., Shenzhen (CN)

(72) Inventors: Miao Wang, Beijing (CN); Zhihao Jin, Beijing (CN); Xinmiao Chang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/556,462

(22) Filed: Dec. 1, 2014

(65) Prior Publication Data

US 2015/0087235 A1    Mar. 26, 2015

Related U.S. Application Data

(63) Continuation of application No. PCT/CN2013/072798, filed on Mar. 18, 2013.

(51) Int. Cl.
| | |
|---|---|
| *H04B 5/00* | (2006.01) |
| *H04W 4/00* | (2009.01) |
| *H04W 8/00* | (2009.01) |

(52) U.S. Cl.
CPC ............. *H04W 4/008* (2013.01); *H04B 5/0031* (2013.01); *H04W 8/005* (2013.01)

(58) Field of Classification Search
CPC .................................. H04B 5/00; H04W 4/008
USPC .................................................. 455/41.1, 41.2
See application file for complete search history.

(56) References Cited

U.S. PATENT DOCUMENTS

| | | | | |
|---|---|---|---|---|
| 2004/0252715 A1 * | 12/2004 | Noda | .................... | H04W 28/18 370/444 |
| 2007/0263596 A1 * | 11/2007 | Charrat | ................... | H04L 45/54 370/351 |

(Continued)

FOREIGN PATENT DOCUMENTS

| | | | |
|---|---|---|---|
| CA | 2837095 A3 | 12/2012 | |
| CN | 1859516 A | 11/2006 | |
| CN | 101692741 A | 4/2010 | |
| CN | 102857276 A | 1/2013 | |
| EP | 1845632 A1 | 10/2007 | |
| EP | 2458899 A1 | 5/2012 | |

OTHER PUBLICATIONS

Foreign Communication From A Counterpart Application, PCT Application No. PCT/CN2013/072798, English Translation of International Search Report dated Dec. 12, 2013, 2 pages.

(Continued)

*Primary Examiner* — Ayodeji Ayotunde
(74) *Attorney, Agent, or Firm* — Conley Rose, P.C.; Grant Rodolph

(57) ABSTRACT

A communication method and apparatus for a near field communication (NFC) device and the NFC device, where the method includes determining a radio frequency (RF) protocol supported by at least one discovered target NFC device; and selecting, according to an RF protocol level or an RF protocol priority, an RF protocol for performing NFC from the RF protocol supported by the at least one target NFC device so as to perform communication with a target NFC device corresponding to the RF protocol determined by selection. The communication method and apparatus provided in the embodiments of the present invention solve a problem that a probability of finding a target NFC device matched with an NFC controller (NFCC) chip function on a local NFC device is low and a problem that device host (DH) resource consumption and power consumption incurred thereof are high.

21 Claims, 4 Drawing Sheets

(56) References Cited

U.S. PATENT DOCUMENTS

| | | | |
|---|---|---|---|
| 2008/0299907 A1* | 12/2008 | Takayama | H04B 5/0031 455/41.2 |
| 2012/0329393 A1 | 12/2012 | Hillan et al. | |
| 2013/0005262 A1 | 1/2013 | Sakata | |
| 2013/0052950 A1* | 2/2013 | Hillan | H04W 8/005 455/41.1 |

OTHER PUBLICATIONS

Foreign Communication From A Counterpart Application, PCT Application No. PCT/CN2013/072798, Written Opinion dated Dec. 12, 2013, 6 pages.

Foreign Communication From A Counterpart Application, European Application No. 13878681.9, Extended European Search Report dated Feb. 8, 2016, 9 pages.

* cited by examiner

COMMUNICATION METHOD AND APPARATUS FOR NFC DEVICE AND NFC DEVICE

CROSS-REFERENCE TO RELATED APPLICATIONS

This application is a continuation application of International Patent Application No. PCT/CN2013/072798, filed on Mar. 18, 2013, which is hereby incorporated by reference in its entirety.

TECHNICAL FIELD

Embodiments of the present invention relate to communications technologies, and in particular, to a communication method and apparatus for a near field communication (NFC) device and the NFC device.

BACKGROUND

NFC is a type of short-range wireless connection technology that implements near-range communication of an electronic device using magnetic field induction.

With increasing popularity of the NFC technology, many user equipment have been integrated with an NFC function. An NFC device may include a device host (DH), an NFC controller (NFCC), and a security element (SE), where the DH is configured to manage the NFCC, for example, perform initialization, configuration, and power management for the NFCC. The NFCC is configured to transmit data to a target NFC device using an radio frequency (RF) interface and an antenna. The SE is configured to provide a safe execution environment for an NFC application program. A smart phone is used as an example. The DH may be a processor central processing unit (CPU) of the phone, the NFCC may be an NFC chip, and the SE may be a subscriber identity module (SIM) card or a secure digital (SD) card.

In the prior art, an NFC device is capable of discovering all target NFC devices and acquiring a radio frequency (RF) protocol supported by each target NFC device, and the NFC device may select a target NFC device according to a discovery sequence of the target NFC devices and usually selects a firstly discovered target NFC device. However, the first discovered target NFC device always does not meet a requirement of the NFC device.

SUMMARY

The present invention provides a communication method and apparatus for an NFC device and the NFC device, so as to solve a problem that a probability of finding, using an NFC discovering method in the prior art, a target NFC device matched with an NFCC chip function on a local NFC device is low and a problem that DH resource consumption and power consumption incurred thereof are high.

According to a first aspect, an embodiment of the present invention provides a communication method for a near field communication NFC device, where the method includes determining an RF protocol supported by at least one discovered target NFC device; and selecting, according to an RF protocol level or an RF protocol priority, an RF protocol for performing NFC communication from the RF protocol supported by the at least one target NFC device so as to perform communication with a target NFC device corresponding to the RF protocol determined by selection.

In a first possible implementation manner of the first aspect, the determining an RF protocol supported by at least one discovered target NFC device includes receiving, by a device host DH, a notification message sent by an NFCC, where the notification message includes information about an RF protocol supported by at least one target NFC device discovered by the NFCC; and the selecting, according to an RF protocol level or an RF protocol priority, an RF protocol for performing NFC communication from the RF protocol supported by the at least one target NFC device so as to perform communication with a target NFC device corresponding to the RF protocol determined by selection includes selecting, by the DH according to the RF protocol level or the RF protocol priority, the RF protocol for performing NFC communication from the RF protocol supported by the at least one target NFC device so as to perform communication with the target NFC device corresponding to the RF protocol determined by selection.

According to the first possible implementation manner of the first aspect, in a second possible implementation manner, before the selecting, by the DH according to the RF protocol priority, the RF protocol for performing NFC communication from the RF protocol supported by the at least one target NFC device so as to perform communication with the target NFC device corresponding to the RF protocol determined by selection, the method further includes receiving, by the DH, a setup instruction input by a user, where the setup instruction includes information about the RF protocol priority.

According to the first or the second possible implementation manner of the first aspect, in a third possible implementation manner, the method further includes sending, by the DH, a radio frequency discovery mapping command to the NFCC, where the radio frequency discovery mapping command includes the information about the RF protocol priority so that the NFCC selects, according to the RF protocol priority, an RF protocol for performing NFC communication from the RF protocol supported by the at least one target NFC device so as to perform communication with a target NFC device corresponding to the RF protocol determined by selection.

In a fourth possible implementation manner of the first aspect, the determining an RF protocol supported by at least one discovered target NFC device includes executing, by an NFCC, a radio frequency discovery process to determine the RF protocol supported by the at least one target NFC device; and the selecting, according to an RF protocol level or an RF protocol priority, an RF protocol for performing NFC communication from the RF protocol supported by the at least one target NFC device so as to perform communication with a target NFC device corresponding to the RF protocol determined by selection includes selecting, by the NFCC according to the RF protocol level or the RF protocol priority, the RF protocol for performing NFC communication from the RF protocol supported by the at least one target NFC device so as to perform communication with the target NFC device corresponding to the RF protocol determined by selection.

According to the fourth possible implementation manner of the first aspect, in a fifth possible implementation manner, before the selecting, by the NFCC according to the RF protocol priority, the RF protocol for performing NFC communication from the RF protocol supported by the at least one target NFC device so as to perform communication with the target NFC device corresponding to the RF protocol determined by selection, the method further includes receiving, by the NFCC, a radio frequency discovery mapping command sent by a DH, where the radio frequency discovery mapping command includes information about the RF protocol priority.

According to the fourth or the fifth possible implementation manner of the first aspect, in a sixth possible implementation manner, the executing, by an NFCC, a radio frequency discovery process to determine the RF protocol supported by the at least one target NFC device includes sending, by the NFCC, a detection request message to the at least one target NFC device; and receiving, by the NFCC, a discovery response message fed back by each target NFC device, where an extension field of the discovery response message includes information about the RF protocol supported by the target NFC device.

According to the sixth possible implementation manner of the first aspect, in a seventh possible implementation manner, if the target NFC device supports an NFC-A technology, the extension field is indicated by an indicator bit b4 and an indicator bit b5 in a selection response message SEL_RES; if the target NFC device supports an NFC-F technology, the extension field is indicated by an indicator bit Byte1 and an indicator bit Byte2 of an NFC device identity NFCID2 in a detection response message SENSF_RES; and if the target NFC device does not support a peer to peer (P2P) technology, the discovery response message is an attribute detection response message ATR_REQ/RES, where a historical byte of the ATR_REQ/RES includes the information about the RF protocol supported by the target NFC device.

According to the first aspect and any one of the first to the seventh possible implementation manners of the first aspect, in an eighth possible implementation manner, the selecting, according to an RF protocol level, an RF protocol for performing NFC communication from the RF protocol supported by the at least one target NFC device so as to perform communication with a target NFC device corresponding to the RF protocol determined by selection includes determining whether an RF protocol with the highest level supported by the at least one target NFC device is in an RF protocol range that can be supported by a local device; and if yes, selecting a target NFC device that supports the RF protocol with the highest level from the at least one target NFC device; and if no, determining whether an RF protocol with the second highest level supported by the at least one target NFC device is in the RF protocol range that can be supported by the local device; and if yes, selecting a target NFC device that supports the RF protocol with the second highest level from the at least one target NFC device.

According to the first aspect and any one of the first to the seventh possible implementation manners of the first aspect, in a ninth possible implementation manner, the selecting, according to an RF protocol priority, an RF protocol for performing NFC communication from the RF protocol supported by the at least one target NFC device so as to perform communication with a target NFC device corresponding to the RF protocol determined by selection includes determining whether an RF protocol with the highest priority supported by the at least one target NFC device is in an RF protocol range that can be supported by a local device; and if yes, selecting a target NFC device that supports the RF protocol with the highest priority from the at least one target NFC device; and if no, determining whether an RF protocol with the second highest priority supported by the at least one target NFC device is in the RF protocol range that can be supported by the local device; and if yes, selecting a target NFC device that supports the RF protocol with the second highest priority from the at least one target NFC device.

According to a second aspect, an embodiment of the present invention provides a communication apparatus for an NFC device, where the apparatus includes a determining module configured to determine an RF protocol supported by at least one discovered target NFC device; and a selecting module configured to select, according to an RF protocol level or an RF protocol priority, an RF protocol for performing NFC communication from the RF protocol supported by the at least one target NFC device so as to perform communication with a target NFC device corresponding to the RF protocol determined by selection.

In a first possible implementation manner of the second aspect, the apparatus is a DH, and the determining module is configured to receive a notification message sent by an NFCC, where the notification message includes information about an RF protocol supported by at least one target NFC device discovered by the NFCC; and the selecting module is configured to select, according to the RF protocol level or the RF protocol priority, the RF protocol for performing NFC communication from the RF protocol supported by the at least one target NFC device so as to perform communication with the target NFC device corresponding to the RF protocol determined by selection.

According to the first possible implementation manner of the second aspect, in a second possible implementation manner, the apparatus further includes a setup instruction receiving module configured to receive, before the selecting module selects, according to the RF protocol priority, the RF protocol for performing NFC communication from the RF protocol supported by the at least one target NFC device so as to perform communication with the target NFC device corresponding to the RF protocol determined by selection, a setup instruction input by a user, where the setup instruction includes information about the RF protocol priority.

According to the first or the second possible implementation manner of the second aspect, in a third possible implementation manner, the apparatus further includes a command sending module configured to send a radio frequency discovery mapping command to the NFCC, where the radio frequency discovery mapping command includes the information about the RF protocol priority so that the NFCC selects, according to the RF protocol priority, the RF protocol for performing NFC communication from the RF protocol supported by the at least one target NFC device so as to perform communication with the target NFC device corresponding to the RF protocol determined by selection.

In a fourth possible implementation manner of the second aspect, the apparatus is an NFCC, and the determining module is configured to execute a radio frequency discovery process to determine the RF protocol supported by the at least one target NFC device; and the selecting module is configured to select, according to the RF protocol level or the RF protocol priority, the RF protocol for performing NFC communication from the RF protocol supported by the at least one target NFC device so as to perform communication with the target NFC device corresponding to the RF protocol determined by selection.

According to the fourth possible implementation manner of the second aspect, in a fifth possible implementation manner, the apparatus further includes a command receiving module configured to receive, before the selecting module selects, according to the RF protocol priority, the RF protocol for performing NFC communication from the RF protocol supported by the at least one target NFC device so as to perform communication with the target NFC device corresponding to the RF protocol determined by selection, a radio frequency discovery mapping command sent by a DH, where the radio frequency discovery mapping command includes information about the RF protocol priority.

According to the fourth or the fifth possible implementation manner of the second aspect, in a sixth possible implementation manner, the determining module includes a sending unit configured to send a detection request message to the at least one target NFC device; and a receiving unit configured to receive a discovery response message fed back by each target NFC device, where an extension field of the discovery response message includes information about the RF protocol supported by the target NFC device.

According to the sixth possible implementation manner of the second aspect, in a seventh possible implementation manner, if the target NFC device supports an NFC-A technology, the extension field is indicated by an indicator bit b4 and an indicator bit b5 in a selection response message SEL_RES; if the target NFC device supports an NFC-F technology, the extension field is indicated by an indicator bit Byte1 and an indicator bit Byte2 of an NFC device identity NFCID2 in a detection response message SENSF_RES; and if the target NFC device does not support a P2P technology, the discovery response message is an attribute detection response message ATR_REQ/RES, where a historical byte of the ATR_REQ/RES includes the information about the RF protocol supported by the target NFC device.

According to the second aspect and any one of the first to the seventh possible implementation manners of the second aspect, in an eighth possible implementation manner, the selecting module is configured to determine whether an RF protocol with the highest level supported by the at least one target NFC device is in an RF protocol range that can be supported by a local device; and if yes, select a target NFC device that supports the RF protocol with the highest level from the at least one target NFC device; and if no, determine whether an RF protocol with the second highest level supported by the at least one target NFC device is in the RF protocol range that can be supported by the local device; and if yes, select a target NFC device that supports the RF protocol with the second highest level from the at least one target NFC device.

According to the second aspect and any one of the first to the seventh possible implementation manners of the second aspect, in an ninth possible implementation manner, the selecting module is configured to determine whether an RF protocol with the highest priority supported by the at least one target NFC device is in an RF protocol range that can be supported by a local device; and if yes, select a target NFC device that supports the RF protocol with the highest priority from the at least one target NFC device; and if no, determine whether an RF protocol with the second highest priority supported by the at least one target NFC device is in the RF protocol range that can be supported by the local device; and if yes, select a target NFC device that supports the RF protocol with the second highest priority from the at least one target NFC device.

According to a third aspect, an embodiment of the present invention provides an NFC device, where the NFC device includes a DH and an NFCC, the DH is the apparatus described in the apparatus embodiment of the DH provided in any embodiment of the present invention; and the NFCC is the apparatus described in the apparatus embodiment of the NFCC provided in any embodiment of the present invention.

According to the communication method and apparatus for an NFC device and the NFC device provided in the embodiments of the present invention, an RF protocol supported by at least one discovered target NFC device is determined to obtain RF protocols supported by all target NFC devices and obtain a basis of selecting, according to the RF protocol, a suitable target NFC device; and an RF protocol for performing NFC communication is selected, according to an RF protocol level or an RF protocol priority, from the RF protocol supported by the at least one target NFC device so as to perform communication with a target NFC device corresponding to the RF protocol determined by selection. In this way, the selected RF protocol supported by the target NFC device meets a requirement of a local NFC device better, a function of an NFCC is utilized to a maximum extent, and executing, on a DH, a task that can be executed by the NFCC is avoided, thereby reducing DH resource consumption and DH power consumption.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The embodiments to be described are a part rather than all of the embodiments of the present invention. All other embodiments obtained by persons of ordinary skill in the art based on the embodiments of the present invention without creative efforts shall fall within the protection scope of the present invention.

An operating mode of an NFC device may be a peer to peer (P2P) mode, a read/write mode, or a card emulation mode. Usually, a device that supports only the card emulation mode is called an NFC tag in this field. Currently, NFC tags defined by the NFC forum include tags of Type 1, Type 2, Type 3, and Type 4. In the embodiments of the present invention, for ease of description, the NFC tag and other NFC devices are collectively referred to as the NFC device. That is, devices having an NFC function are all referred to as NFC devices.

Figure 1:
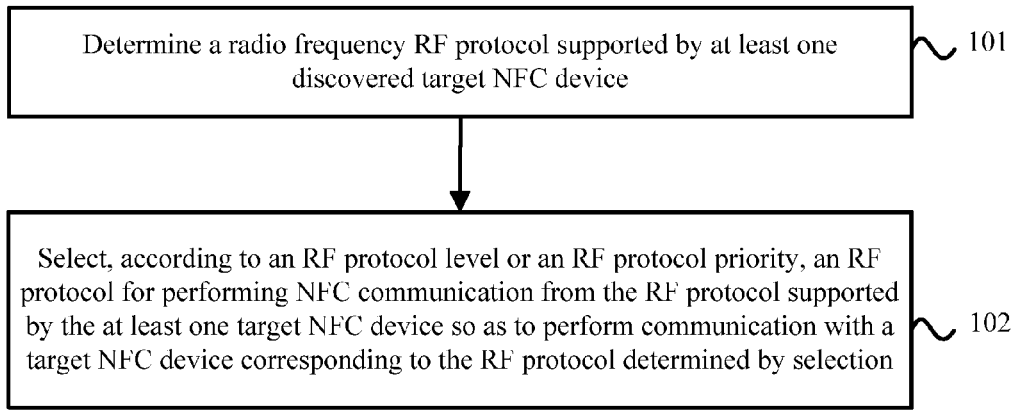
FIG. 1 is a flowchart of a communication method for an NFC device according to a first embodiment of the present invention.

FIG. 1 is a flowchart of a communication method for an NFC device according to a first embodiment of the present invention. An executive body of this embodiment is an NFC device. The method may be executed by a DH in the NFC device, or may be executed by an NFCC. As shown in FIG. 1, the method in this embodiment may include the following steps:

Step 101: Determine an RF protocol supported by at least one discovered target NFC device.

When discovering a target NFC device, the NFC device is capable of obtaining all target NFC devices in an effective range of NFC communication and is capable of obtaining an RF protocol supported by each target NFC device. A process that the NFC device discovers the target NFC device is usually executed by an NFCC. Therefore, when the executive body of this embodiment is an NFCC, the determining an RF protocol supported by each discovered target NFC device in step 101 may actually be a process of executing, by the NFCC, radio frequency discovery; and when the executive body of this embodiment is a DH, the determining a radio frequency RF protocol supported by each discovered target NFC device in step 101 actually is receiving a notification message sent by the NFCC.

Step 102: Select, according to an RF protocol level or an RF protocol priority, an RF protocol for performing NFC communication from the RF protocol supported by the at least one target NFC device so as to perform communication with a target NFC device corresponding to the RF protocol determined by selection.

The NFC device in the prior art usually selects a firstly discovered target NFC device according to a time sequence and usually selects an RF protocol in the first notification message, which is sent by the NFCC and received by the DH, as a communication protocol. It is possible that a local NFC device supports an RF protocol with a relatively high level, for example, the logic link control protocol (LLCP), while both a target NFC device that supports LLCP and a target NFC device that supports only an RF protocol with a relatively low level, for example, the NFC-data exchange protocol (NFC-DEP) exist in the at least one target NFC device. If a principle of selecting a first discovered target NFC device and a first discovered RF protocol is used, the target NFC device that supports only an RF protocol with a lower level may be selected as the target NFC device for performing NFC communication. Alternatively, even if both the local NFC device and the target NFC device support an RF protocol with a relatively high level, it is still possible that an RF protocol with a relatively low level is selected to perform communication. In this case, during the NFC communication process, the local NFC device cannot make full use of features provided by an NFCC chip, and it is necessary to run a higher RF protocol on the DH. This increases DH power consumption and consumes more DH resources.

In step 102 of this embodiment, the RF protocol and the target NFC device for performing the NFC communication are selected according to the RF protocol level or the RF protocol priority. The RF protocols supported by all target NFC devices determined in step 101 are stored in a list, and the RF protocols are sorted according to the protocol level or according to the RF protocol priority. An RF protocol with the highest RF protocol level or the highest RF protocol priority is selected, and a target NFC device corresponding to the RF protocol is selected.

During a specific implementation, if the selected RF protocol corresponds to a plurality of target NFC devices, that is, more than one target NFC device supports the RF protocol, one target NFC device that supports the RF protocol may be selected randomly or according to a discovery sequence.

In this embodiment, an RF protocol supported by at least one discovered target NFC device is determined to obtain RF protocols supported by all target NFC devices and obtain a basis of selecting, according to the RF protocol, a suitable target NFC device; and an RF protocol for performing NFC communication is selected, according to an RF protocol level or an RF protocol priority, from the RF protocol supported by the at least one target NFC device so as to perform communication with a target NFC device corresponding to the RF protocol determined by selection. In this way, the selected RF protocol supported by the target NFC device meets a requirement of a local NFC device better, a function of an NFCC is utilized to a maximum extent, and executing, on a DH, a task that can be executed by the NFCC is avoided, thereby reducing DH resource consumption and DH power consumption.

In an embodiment, during a process of selecting the RF protocol with the highest RF protocol level or the highest RF protocol priority in the foregoing embodiment, it is further necessary to ensure that the local NFC device also supports the selected RF protocol. Therefore, during a selection process, whether the local NFC device supports the RF protocol to be selected may further be determined, and if the local NFC device does not support the RF protocol to be selected, an RF protocol with the second highest RF protocol level or the second highest RF protocol priority may be selected, and so on, until an RF protocol with the highest RF protocol level or the highest RF protocol priority in a local NFC supportable range is selected.

In the foregoing embodiment, if the selection is performed according to the RF protocol level, step 102 may include the following steps.

First step: Determine whether an RF protocol with the highest level supported by the at least one target NFC device is in an RF protocol range that can be supported by the local device; and if yes, select a target NFC device that supports the RF protocol with the highest level from the at least one target NFC device.

The RF protocol range that can be supported by the local device usually can be obtained when the local NFC device is being initialized, where initialization may be, for example, starting the local NFC device, or enabling the NFC function on the local NFC device. A process of the initialization may include reading, by the DH, an RF interface supported by the NFCC; and binding, by the DH, each RF interface with an RF protocol corresponding to each interface, and sending a result of the binding to the NFCC using a radio frequency discovery mapping command. In this way, both the DH and the NFCC obtain the RF protocol range that can be supported by the local device.

Second step: If no, determine whether an RF protocol with the second highest level supported by the at least one target NFC device is in the RF protocol range that can be supported by the local device; and if yes, select a target NFC device that supports the RF protocol with the second highest level from the at least one target NFC device.

If the RF protocol with the second highest level is not in the RF protocol range that can be supported by the local device either, determine whether an RF protocol with the third highest level supported by the at least one target NFC device is in the RF protocol range that can be supported by the local device, and so on, until the RF protocol with the highest RF protocol level in the local NFC supportable range is selected.

If the selection is performed according to the RF protocol priority, step 102 may include the following steps.

First step: Determine whether an RF protocol with the highest priority supported by the at least one target NFC device is in an RF protocol range that can be supported by the local device; and if yes, select a target NFC device that supports the RF protocol with the highest priority from the at least one target NFC device.

Second step: If no, determine whether an RF protocol with the second highest priority supported by the at least one target NFC device is in the RF protocol range that can be supported by the local device; and if yes, select a target NFC device that supports the RF protocol with the second highest priority from the at least one target NFC device.

If the RF protocol with the second highest priority is not in the RF protocol range that can be supported by the local device either, determine whether an RF protocol with the third highest priority supported by the at least one target NFC device is in the RF protocol range that can be supported by the local device, and so on, until the RF protocol with the highest RF protocol priority in the local NFC supportable range is selected.

If the local NFC device is capable of supporting an existing RF protocol with the highest RF protocol level, or it is clearly known that the local NFC device supports all RF protocols, the foregoing process of determining whether the local NFC device supports the RF protocol to be selected can be omitted.

Several specific embodiments are adopted as follows to describe in detail the technical solutions of the method embodiment shown in FIG. 1.

Figure 2:
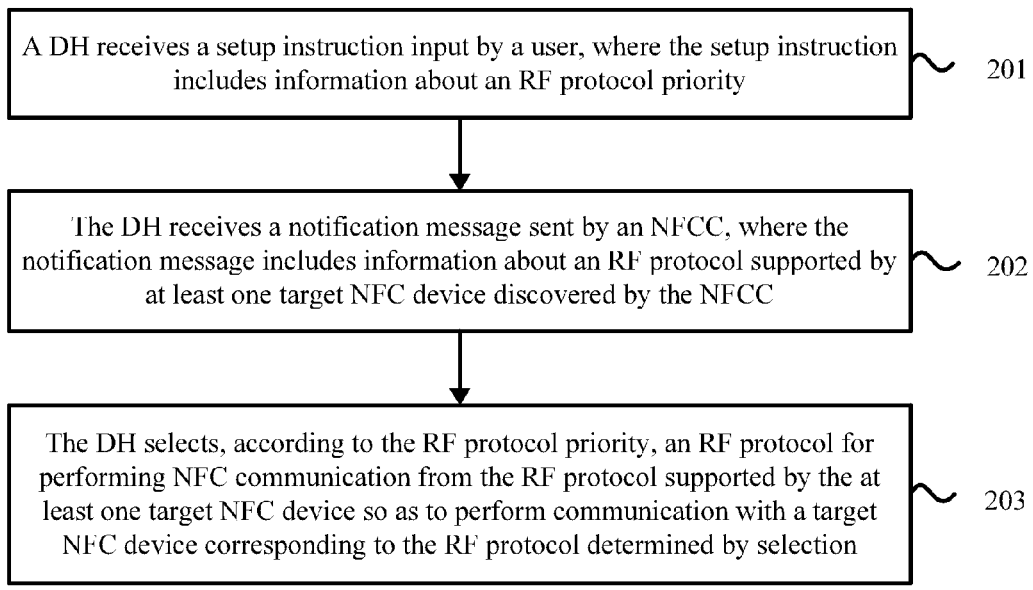
FIG. 2 is a flowchart of a communication method for an NFC device according to a second embodiment of the present invention.

FIG. 2 is a flowchart of a communication method for an NFC device according to a second embodiment of the present invention. An executive body of this embodiment is a DH. As shown in FIG. 2, the method in this embodiment may include the following steps.

Step 201: A DH receives a setup instruction input by a user, where the setup instruction includes information about an RF protocol priority.

An NFC library file may be stored on the DH, and the NFC library file stores RF protocols for setup. The DH may provide the user with an interface for writing an application program, so that the user can input the setup instruction through the interface to call the NFC library file stored on the DH and the user can set a priority for each RF protocol. The DH obtains the RF protocol priority by receiving the setup instruction which is input by the user and includes the information about the RF protocol priority, so that a target NFC device can be selected according to the RF protocol priority subsequently.

Herein, setting, by the user, a priority for each RF protocol may be setting different priorities for a plurality of RF protocols separately, or selecting only one RF protocol. The DH sets an RF protocol priority of an RF protocol that is not selected to lowest. That is, the user can designate an RF protocol, so that the local NFC device only selects a target NFC device of the designated RF protocol, thereby improving discovery and selection efficiency.

Step 202: The DH receives a notification message sent by an NFCC, where the notification message includes information about an RF protocol supported by at least one target NFC device discovered by the NFCC.

The information about the RF protocol supported by the at least one target NFC device may be obtained during a process of executing, by the NFCC, radio frequency discovery. That is, the DH obtains the information about the RF protocol supported by the at least one target NFC device by receiving the notification message that is sent by the NFCC and includes the information about the RF protocol supported by the at least one target NFC device.

Step 203: The DH selects, according to the RF protocol priority, an RF protocol for performing NFC communication from the RF protocol supported by the at least one target NFC device so as to perform communication with a target NFC device corresponding to the RF protocol determined by selection.

In this embodiment, the DH determines an RF protocol priority by receiving a setup instruction input by a user, so that the user can set the RF protocol priority according to a specific requirement or a requirement corresponding to application software that is required by the user, and therefore an RF protocol and a target NFC device that meet a personalized requirement of the user can be selected in a subsequent selection process.

In the foregoing embodiment, the selecting the target NFC device according to the RF protocol priority in step 203 may be replaced with selecting the target NFC device according to an RF protocol level. In this case, step 201 may be omitted, or step 201 may be retained, and the selecting the target NFC device according to the RF protocol level is used as an alternative solution to meet some special scenarios. For example, the RF protocol priority set by the user is unreasonable, or the target NFC device that meets the RF protocol priority set by the user is not found during the execution process of step 203; in this case, the user may be prompted that the target NFC device that meets the RF protocol priority set by the user is not discovered, and the target NFC device selected according to the RF protocol level is used as a result.

Figure 3:
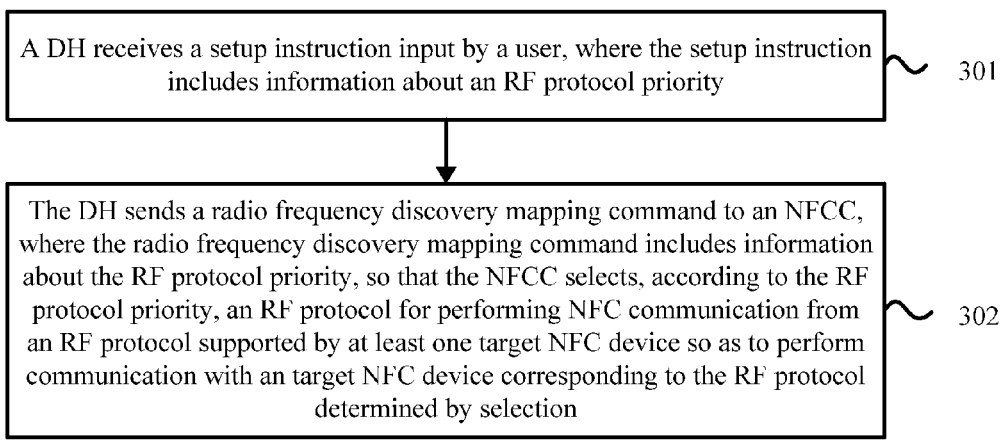
FIG. 3 is a flowchart of a communication method for an NFC device according to a third embodiment of the present invention.

FIG. 3 is a flowchart of a communication method for an NFC device according to a third embodiment of the present invention. An executive body of this embodiment is a DH, and in the method of this embodiment, an NFCC selects, according to an RF protocol priority, an RF protocol for performing NFC communication from an RF protocol supported by at least one target NFC device so as to perform communication with a target NFC device corresponding to the RF protocol determined by selection. As shown in FIG. 3, the method that the DH needs to execute in this embodiment may include the following steps.

Step 301: A DH receives a setup instruction input by a user, where the setup instruction includes information about an RF protocol priority.

Step 302: The DH sends a radio frequency discovery mapping command to an NFCC, where the radio frequency discovery mapping command includes information about the RF protocol priority, so that the NFCC selects, according to the RF protocol priority, an RF protocol for performing NFC communication from an RF protocol supported by at least one target NFC device so as to perform communication with a target NFC device corresponding to the RF protocol determined by selection.

In the prior art, when performing initialization for the NFCC, the DH binds each RF interface with an RF protocol corresponding to each RF interface and sends a result of the binding to the NFCC using the radio frequency discovery mapping command. Therefore, in the foregoing step 302, the information about the RF protocol priority may be carried in an extension field of the radio frequency discovery mapping command, and the extension field may be, for example, a newly added field "priority" or "Priority" of the radio frequency discovery mapping command.

In this embodiment, a DH carries an RF protocol priority obtained by itself in a radio frequency discovery mapping command and sends the radio frequency discovery mapping command to an NFCC, so that the NFCC obtains the RF protocol priority, thereby meeting a scenario in which a process of selecting, according to the RF protocol priority, an RF protocol for performing NFC communication from the RF protocol supported by the at least one target NFC device is implemented by the NFCC. When the executive body for selecting the target NFC device is changed from the DH to the NFCC, a function of the NFCC can be further utilized, and DH resource consumption and power consumption are reduced.

Figure 4:
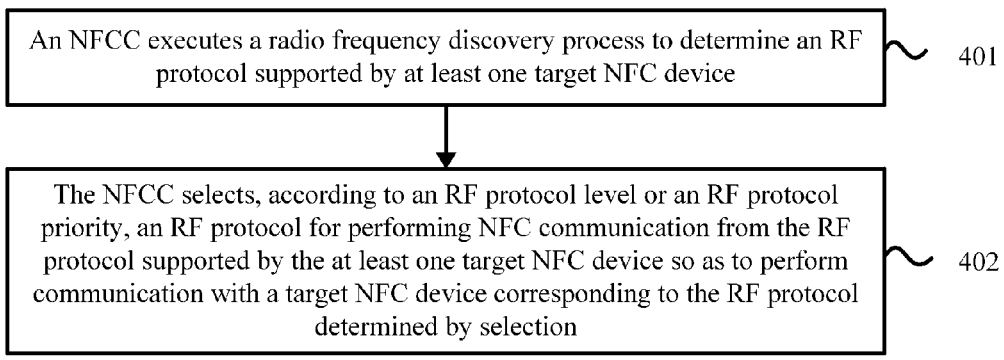
FIG. 4 is a flowchart of a communication method for an NFC device according to a fourth embodiment of the present invention.

FIG. 4 is a flowchart of a communication method for an NFC device according to a fourth embodiment of the present invention. An executive body of this embodiment is an NFCC. As shown in FIG. 4, the method in this embodiment may include the following steps.

Step 401: An NFCC executes a radio frequency discovery process to determine an RF protocol supported by at least one target NFC device.

Step 402: The NFCC selects, according to an RF protocol level or an RF protocol priority, an RF protocol for performing NFC communication from the RF protocol supported by the at least one target NFC device so as to perform communication with a target NFC device corresponding to the RF protocol determined by selection.

In this embodiment, an NFCC executes a radio frequency discovery process to determine an RF protocol supported by at least one target NFC device, obtain RF protocols supported by all target NFC devices, and obtain a basis of selecting a suitable target NFC device according to the RF protocol; and the NFCC selects, according to an RF protocol level or an RF protocol priority, an RF protocol for performing NFC communication from the RF protocol supported by the at least one target NFC device so as to perform communication with a target NFC device corresponding to the RF protocol determined by selection. In this way, the selected RF protocol supported by the target NFC device meets a requirement of a local NFC device better, and a function of the NFCC is utilized to a maximum extent, and executing, on a DH, a task that can be executed by the NFCC is avoided, thereby reducing DH resource consumption and DH power consumption. In addition, when the NFCC is used as the executive body to select the target NFC device, the function of the NFCC can be further utilized, and DH resource consumption and power consumption are reduced.

Figure 5:
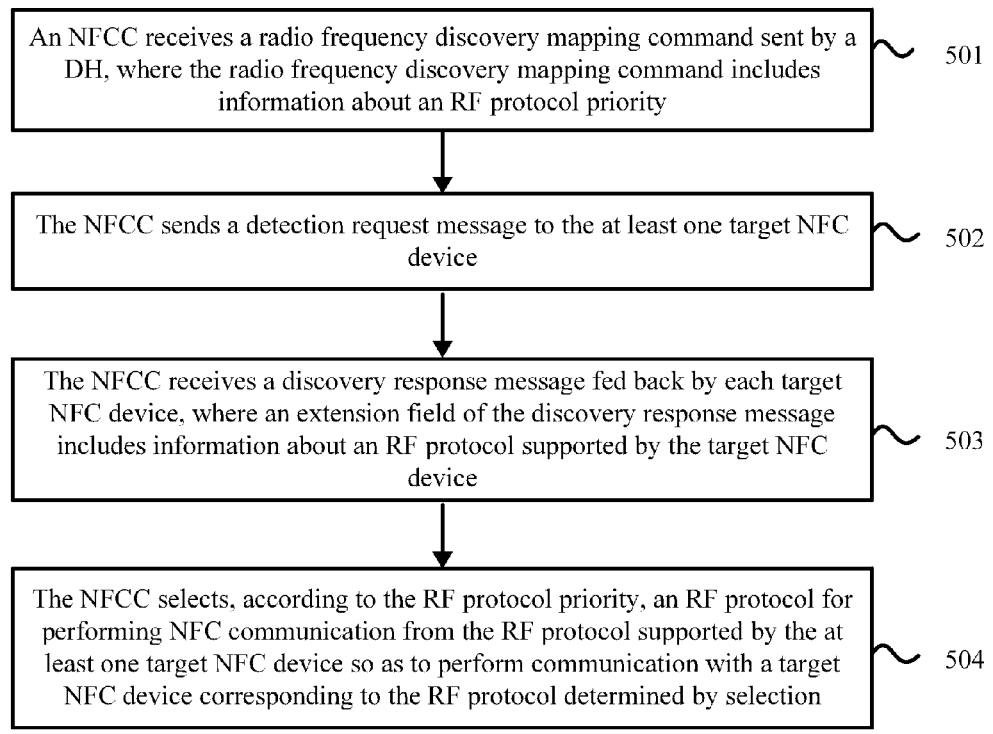
FIG. 5 is a flowchart of a communication method for an NFC device according to a fifth embodiment of the present invention.

FIG. 5 is a flowchart of a communication method for an NFC device according to a fifth embodiment of the present invention. An executive body of this embodiment is an NFCC. This embodiment introduces that the NFCC selects, according to an RF protocol priority, a target NFC device for performing communication, and describes a radio frequency transmission process executed by the NFCC. As shown in FIG. 5, the method in this embodiment may include the following steps.

Step 501: An NFCC receives a radio frequency discovery mapping command sent by a DH, where the radio frequency discovery mapping command includes information about an RF protocol priority.

A method of obtaining, by the NFCC, the RF protocol priority may also be implemented by receiving another notification message sent by the DH. It is a preferable manner to carry the information about the RF protocol priority in the radio frequency discovery mapping command, which is not limited in this embodiment of the present invention.

Step 502: The NFCC sends a detection request message to at least one target NFC device.

Step 503: The NFCC receives a discovery response message fed back by each target NFC device, where an extension field of the discovery response message includes information about an RF protocol supported by the target NFC device.

In the prior art, the extension field of the discovery response message also includes the information about the RF protocol supported by the target NFC device. It usually includes only an RF protocol with a relatively low level, but does not include an RF protocol with a relatively high level such as LLCP LOW or LLCP HIGH. Therefore, in step 503 of this embodiment, the discovery response message is extended, so that the discovery response message can include all RF protocols supported by the target NFC device.

The extension field in step 503 may be a newly added field in the discovery response message. Or, if the discovery response message still has an available field, for example, an original reserved field in the discovery response message, the reserved field may be adopted as an extension field. The purpose is to add a field for indicating the information about the RF protocol supported by the target NFC device.

Further, the extension field of the response message varies with a technology supported by the target NFC device, which is as follows. If the target NFC device supports an NFC-A technology, the extension field is indicated by an indicator bit b4 and an indicator bit b5 in a selection response message SEL_RES; if the target NFC device supports an NFC-F technology, the extension field is indicated by an indicator bit Byte1 and an indicator bit Byte2 of an NFC device identity NFCID2 in a detection response message SENSF_RES; and if the target NFC device does not support a P2P technology, the discovery response message is an attribute detection response message ATR_REQ/RES, where a historical byte of the ATR_REQ/RES includes the information about the RF protocol supported by the target NFC device.

A discovery response message in the prior art includes part of information of RF protocol supported by a target NFC device. For a target NFC device that supports the NFC-A technology, an indicator bit b6 and an indicator bit b7 in an SEL_RES message are used to indicate part of the RF protocol supported by the target NFC device, while RF protocols with high levels such as LLCP LOW and LLCP HIGH cannot be indicated. In this embodiment of the present invention, the indicator bit b4 and the indicator bit b5 of the extension field and the existing indicator bit b6 and indicator bit b7 in the SEL_RES message are used to indicate all RF protocols supported by the target NFC device. Therefore, when the NFCC receives a discovery response message fed back by each target NFC device, for the SEL_RES message, information in a b4-b7 indicator bits needs to be read; and for a target NFC device that supports the NFC-F technology, a value range assigned for the indicator bit Byte1 and the indicator bit Byte2 of the NFCID2 field in SENSF_RES is extended to indicate all RF protocols supported by the target NFC device. In addition, when the NFCC receives the discovery response message fed back by each target NFC device, for the SENS-F_RES message, information in the indicator bit Byte1 and the indicator bit Byte2 indicator bits of the NFCID2 field needs to be read; and for a target NFC device that does not support the P2P technology, information about the supported RF protocol is included in a historical byte in the discovery response message ATR_REQ/RES. Therefore, when the NFCC receives the discovery response message fed back by each target NFC device, for the ATR_REQ/RES, the historical byte therein needs to be read.

Step 504: The NFCC selects, according to the RF protocol priority, an RF protocol for performing NFC communication from the RF protocol supported by the at least one target NFC device so as to perform communication with a target NFC device corresponding to the RF protocol determined by selection.

In this embodiment, an NFCC obtains, by receiving a radio frequency discovery mapping command which is sent by a DH and includes information about an RF protocol priority, the RF protocol priority for selecting a target NFC device, obtains all RF protocols supported by the target NFC device by receiving a discovery response message fed back by each target NFC device and reading information carried in an extension field, and selects, according to the RF protocol priority, an RF protocol for performing NFC communication from the RF protocol supported by at least one target NFC device so as to perform communication with a target NFC device corresponding to the RF protocol determined by selection. In this way, the selected RF protocol supported by the target NFC device meets a requirement of a local NFC device better, a function of the NFCC is utilized to a maximum extent, and executing, on a DH, a task that can be executed by the NFCC is avoided, thereby reducing DH resource consumption and DH power consumption. In addition, when the NFCC is used as the executive body to select the target NFC device, the function of the NFCC can be further utilized, and DH resource consumption and power consumption are reduced.

In the foregoing embodiment, a specific method of the radio frequency discovery by the NFCC and a specific method of obtaining, using the extension field of the response message, the information about the RF protocol supported by each target NFC device in step 503 are also applicable to the corresponding method executed by the NFCC in the technical solutions in any foregoing embodiment.

In the foregoing embodiment, the selecting the target NFC device according to the RF protocol priority in step 504 may be replaced with selecting the target NFC device according to an RF protocol level. In this case, step 501 may be omitted, or step 501 may be retained and the selecting the target NFC device according to the RF protocol level is used as an alternative solution to meet some special scenarios. For example, the target NFC device that meets the RF protocol priority is not found during the execution process of step 504. In this case, the user may be prompted that the target NFC device that meets the RF protocol priority is not discovered, and the target NFC device selected according to the RF protocol level is used as a result.

Figure 6:
FIG. 6 is a schematic structural diagram of a communication apparatus for an NFC device according to a first embodiment of the present invention.

FIG. 6 is a schematic structural diagram of a communication apparatus for an NFC device according to a first embodiment of the present invention. An apparatus 600 in this embodiment may be a DH, or may be an NFCC. As shown in FIG. 6, the apparatus in this embodiment may include a determining module 11 and a selecting module 12, where the determining module 11 is configured to determine an RF protocol supported by at least one discovered target NFC device; and the selecting module 12 is configured to select, according to an RF protocol level or an RF protocol priority, an RF protocol for performing NFC communication from the RF protocol supported by the at least one target NFC device so as to perform communication with a target NFC device corresponding to the RF protocol determined by selection.

The apparatus in this embodiment may be configured to execute the technical solution of the method embodiment shown in FIG. 1 and has corresponding functional modules. The implementation principles thereof are similar, and therefore details are not described herein again.

The technical effect of the apparatus in this embodiment is that an RF protocol supported by at least one discovered target NFC device is determined to obtain RF protocols supported by all target NFC devices and obtain a basis of selecting, according to the RF protocol, a suitable target NFC device; and an RF protocol for performing NFC communication is selected, according to an RF protocol level or an RF protocol priority, from the RF protocol supported by the at least one target NFC device, and a corresponding target NFC device is selected. In this way, the selected RF protocol supported by the target NFC device meets a requirement of a local NFC device better, and a function of an NFCC is utilized to a maximum extent, and executing, on a DH, a task that can be executed by the NFCC is avoided, thereby reducing DH resource consumption and DH power consumption.

In an embodiment, if the apparatus in the foregoing embodiment is a DH, the determining module 11 may be configured to receive a notification message sent by an NFCC, where the notification message includes information about an RF protocol supported by at least one target NFC device discovered by the NFCC; and the selecting module 12 may be configured to select, according to an RF protocol level or an RF protocol priority, an RF protocol for performing NFC communication from the RF protocol supported by the at least one target NFC device so as to perform communication with a target NFC device corresponding to the RF protocol determined by selection.

In an embodiment, if the apparatus in the foregoing embodiment is an NFCC, the determining module 11 may be configured to execute a radio frequency discovery process to determine an RF protocol supported by at least one target NFC device; and the selecting module 12 may be configured to select, according to an RF protocol level or an RF protocol priority, an RF protocol for performing NFC communication from the RF protocol supported by the at least one target NFC device so as to perform communication with a target NFC device corresponding to the RF protocol determined by selection.

Figure 7:
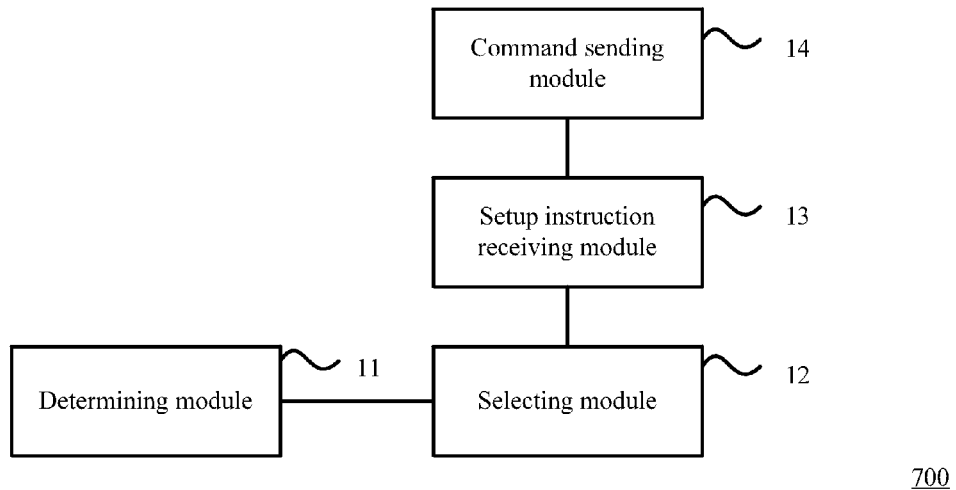
FIG. 7 is a schematic structural diagram of a communication apparatus for an NFC device according to a second embodiment of the present invention.

FIG. 7 is a schematic structural diagram of a communication apparatus for an NFC device according to a second embodiment of the present invention. An apparatus 700 in this embodiment may be a DH. As shown in FIG. 7, on the basis of the apparatus shown in FIG. 6, the apparatus of this embodiment may further include a setup instruction receiving module 13, where the setup instruction receiving module 13 may be configured to receive, before the selecting module selects, according to the RF protocol priority, the RF protocol for performing NFC communication from the RF protocol supported by the at least one target NFC device so as to perform communication with the target NFC device corresponding to the RF protocol determined by selection, a setup instruction input by a user, where the setup instruction includes information about the RF protocol priority.

The apparatus in this embodiment may further include a command sending module 14. The command sending module 14 may be configured to send a radio frequency discovery mapping command to the NFCC, where the radio frequency discovery mapping command includes the information about the RF protocol priority, so that the NFCC selects, according to the RF protocol priority, the RF protocol for performing NFC communication from the RF protocol supported by the at least one target NFC device so as to perform communication with the target NFC device corresponding to the RF protocol determined by selection.

The apparatus in this embodiment may be configured to execute the technical solution of the method embodiment shown in FIG. 2 or FIG. 3 and has corresponding functional modules. The implementation principles and technical effects thereof are similar, and therefore details are not described herein again.

Figure 8:
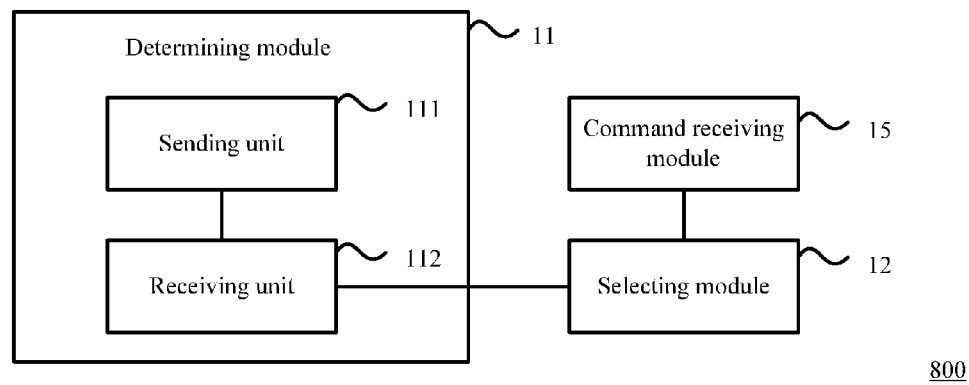
FIG. 8 is a schematic structural diagram of a communication apparatus for an NFC device according to a third embodiment of the present invention.

FIG. 8 is a schematic structural diagram of a communication apparatus for an NFC device according to a third embodiment of the present invention. An apparatus 800 in this embodiment may be an NFCC. As shown in FIG. 8, on the basis of the apparatus shown in FIG. 6, the apparatus in this embodiment may further include a command receiving module 15 where the command receiving module 15 may be configured to receive, before the selecting module selects, according to the RF protocol priority, the RF protocol for performing NFC communication from the RF protocol supported by the at least one target NFC device so as to perform communication with the target NFC device corresponding to the RF protocol determined by selection, a radio frequency discovery mapping command sent by a DH, where the radio frequency discovery mapping command includes information about the RF protocol priority.

Further, in the apparatus in this embodiment, the determining module 11 may include a sending unit 111 and a receiving unit 112, where the sending unit 111 may be configured to send a detection request message to the at least one target NFC device; and the receiving unit 112 may be configured to receive a discovery response message fed back by each target NFC device, where an extension field of the discovery response message includes information about the RF protocol supported by the target NFC device.

In an embodiment, if the target NFC device supports an NFC-A technology, the extension field is indicated by an indicator bit b4 and an indicator bit b5 in a selection response message SEL_RES; if the target NFC device supports an NFC-F technology, the extension field is indicated by an indicator bit Byte1 and an indicator bit Byte2 of an NFC device identity NFCID2 in a detection response message SENSF_RES; and if the target NFC device does not support a peer to peer P2P technology, the discovery response message is an attribute detection response message ATR_REQ/RES, where a historical byte of the ATR_REQ/RES includes the information about the RF protocol supported by the target NFC device.

The apparatus in this embodiment may be configured to execute the technical solution of the method embodiment shown in FIG. 4 or FIG. 5 and has corresponding functional modules. The implementation principles and technical effects thereof are similar, and therefore details are not described herein again.

Further, in each of the foregoing apparatus embodiments, the selecting module 12 may be configured to determine whether an RF protocol with the highest level supported by the at least one target NFC device is in an RF protocol range that can be supported by a local device; and if yes, select a target NFC device that supports the RF protocol with the highest level from the at least one target NFC device; and if no, determine whether an RF protocol with the second highest level supported by the at least one target NFC device is in the RF protocol range that can be supported by the local device; and if yes, select a target NFC device that supports the RF protocol with the second highest level from the at least one target NFC device.

Alternatively, in each of the foregoing apparatus embodiments, the selecting module 12 may be configured to determine whether an RF protocol with the highest priority supported by the at least one target NFC device is in an RF protocol range that can be supported by a local device; and if yes, select a target NFC device that supports the RF protocol with the highest priority from the at least one target NFC device; and if no, determine whether an RF protocol with the second highest priority supported by the at least one target NFC device is in the RF protocol range that can be supported by the local device; and if yes, select a target NFC device that supports the RF protocol with the second highest priority from the at least one target NFC device.

Figure 9:
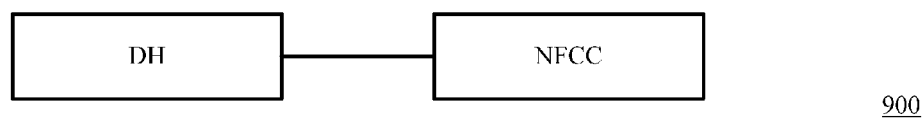
FIG. 9 is a schematic structural diagram of an NFC device according to an embodiment of the present invention.

FIG. 9 is a schematic structural diagram of an NFC device according to an embodiment of the present invention. As shown in FIG. 9, a user equipment 900 in this embodiment may include a DH and an NFCC. The DH may adopt a structure illustrated in the apparatus embodiment shown in FIG. 6 or FIG. 7, and correspondingly, the DH is capable of executing the technical solution of any one method embodiment shown in FIG. 1 to FIG. 3. The implementation principles and technical effects are similar, and therefore details are not described herein again. The NFCC may adopt a structure illustrated in the apparatus embodiment shown in FIG. 6 or FIG. 8, and correspondingly, the NFCC is capable of executing the technical solution of any one method embodiment shown in FIG. 1, FIG. 4, or FIG. 5. The implementation principles and technical effects are similar, and therefore details are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication method performed by a first near field communication (NFC) device that comprises a computer processor coupled to a NFC controller (NFCC), the method comprising:
    obtaining NFC radio frequency (RF) protocol priority information for a plurality of NFC RF protocols supported by the first NFC device;
    determining, by the NFCC, one or more NFC RF protocols supported by a second NFC device;
    selecting, according to the NFC RF protocol priority information, a selected NFC RF protocol from the one or more RF protocols supported by the second NFC device; and
    performing, by the NFCC, NFC communication with the second NFC device using the selected NFC RF protocol.

2. The method according to claim 1, wherein determining the one or more NFC RF protocols supported by the second NFC device comprises receiving, by the computer processor, a notification message sent by the NFCC, and wherein the notification message comprises information about the NFC RF protocols supported by the second NFC device.

3. The method according to claim 2, wherein obtaining the NFC RF protocol priority information for the plurality of NFC RF protocols supported by the first NFC device comprises receiving the NFC RF protocol priority information from a user of the first NFC device during setup process of the first NFC device.

4. The method according to claim 2, further comprising sending, by the computer processor, a radio frequency discovery mapping command to the NFCC, wherein the radio frequency discovery mapping command comprises the NFC RF protocol priority information.

5. The method according to claim 1, wherein selecting, according to the RF protocol priority information, the selected NFC RF protocol from the one or more NFC RF protocols supported by the second NFC device is performed by the computer processor.

6. The method according to claim 1, wherein determining the one or more NFC RF protocols supported by the second NFC device comprises executing, by the NFCC, a radio frequency discovery process to determine the one or more NFC RF protocols supported by the second NFC device.

7. The method according to claim 6, wherein executing, by the NFCC, the radio frequency discovery process to determine the one or more NFC RF protocols supported by the second NFC device comprises:
  sending, by the NFCC, a detection request message to the second NFC device; and
  receiving, by the NFCC, a discovery response message from the second NFC device, wherein an extension field of the discovery response message comprises information about the one or more NFC RF protocols supported by the second NFC device.

8. The method according to claim 7, wherein when the second NFC device supports an NFC-A technology, the extension field is indicated by an indicator bit b4 and an indicator bit b5 in a selection response message SEL_RES, wherein when the second NFC device supports an NFC-F technology, the extension field is indicated by an indicator bit Byte1 and an indicator bit Byte2 of an NFC device identity NFCID2 in a detection response message SENSF_RES, and wherein when the second NFC device does not support a peer to peer (P2P) technology, the discovery response message is an attribute detection response message ATR_REQ/RES, wherein a historical byte of the ATR_REQ/RES comprises the information about the one or more NFC RF protocols supported by the second NFC device.

9. The method according to claim 1, wherein selecting, according to the NFC RF protocol priority information, the selected NFC RF protocol from the one or more NFC RF protocols supported by the second NFC device comprises:
  determining whether an NFC RF protocol with a highest priority from the RF protocols supported by the second NFC device and according to the NFC RF protocol, priority information is one of the plurality of NFC RF protocols supported by the first NFC device;
  selecting the NFC RF protocol with the highest priority when the NFC RF protocol with the highest priority is one of the plurality of NFC RF protocols supported by the first NFC device;
  determining whether an NFC RF protocol with a second highest priority from the NFC RF protocols supported by the second NFC device and according to the NFC RF protocol priority information is one of the plurality of NFC RF protocols supported by the first NFC device when the NFC RF protocol with the highest priority is not one of the plurality of NFC RF protocols supported by the first NFC device; and
  selecting the NFC RF protocol with the second highest priority when the NFC RF protocol with the second highest priority is one of the plurality of NFC RF protocols supported by the first NFC device.

10. A communication apparatus for a first near field communication (NFC) device comprising:
  a receiver configured to receive user input from a user of the first NFC device that indicates NFC RF protocol priority information for a plurality of NFC RF protocols supported by the first NFC device;
  a NFC controller (NFCC); and
  a computer processor coupled to the NFCC and the receiver and configured to instruct the NFCC to:
    determine one or more NFC radio frequency (RF) protocols supported by a second NFC device; and
    perform communication with the second NFC device using a selected NFC RF protocol,
  wherein the computer processor is further configured to select, according to the NFC RF protocol priority information, the selected NFC RF protocol from the one or more NFC RF protocols supported by the second NFC device.

11. The apparatus according to claim 10, wherein the computer processor is further configured to receive a notification message sent by the NFCC, and wherein the notification message comprises information about NFC RF protocols supported by the second NFC device.

12. The apparatus according to claim 11, wherein the receiver receives the priority information from the user of the first NFC device during a setup process of the first NFC device, wherein the computer processor stores the NFC RF protocol priority information in a NFC library file, and wherein the NFC RF protocol priority information indicates an order of preference for using the plurality of NFC RF protocols supported by the first NFC device when performing NFC communication.

13. The apparatus according to claim 11, wherein the computer processor is further configured to instruct, by a radio frequency discovery mapping command, the NFCC to perform a radio frequency discovery process, and wherein the radio frequency discovery mapping command comprises the NFC RF protocol priority information.

14. The apparatus according to claim 13, wherein the NFCC is configured to execute the radio frequency discovery process to determine the one or more NFC RF protocols supported by the second NFC device.

15. The apparatus according to claim 14, wherein, to execute the radio frequency discovery process, the NFCC is further configured to:
  send a detection request message to the second NFC device; and
  receive a discovery response message from the second NFC device, wherein an extension field of the discovery response message comprises information about the one or more NFC RF protocols supported by the second NFC device.

16. The apparatus according to claim 15, wherein when the second NFC device supports an NFC-A technology, the extension field is indicated by an indicator bit b4 and an indicator bit b5 in a selection response message SEL_RES, wherein when the second NFC device supports an NFC-F technology, the extension field is indicated by an indicator bit Byte1 and an indicator bit Byte2 of an NFC device identity NFCID2 in a detection response message SENSF_RES, and wherein when the second NFC device does not support a peer to peer (P2P) technology, the discovery response message is an attribute detection response message ATR_REQ/RES, wherein a historical byte of the ATR_REQ/RES comprises information about the one or more NFC RF protocol supported by the second NFC device.

17. The apparatus according to claim 10, wherein the computer processor is further configured to:
  determine whether an NFC RF protocol with a highest priority from the NFC RF protocols supported by the second NFC device and according to the NFC RF protocol priority information is one of the plurality of NFC RF protocols supported by the first NFC device;

select the NFC RF protocol with the highest priority when the NFC RF protocol with the highest priority is one of the plurality of NFC RF protocols supported by the first NFC device;

determine whether an NFC RF protocol with a second highest priority from the NFC RF protocols supported by the second NFC device and according to the NFC RF protocol priority information is one of the plurality of NFC RF protocols supported by the first NFC device when the NFC RF protocol with the highest priority is not one of the plurality of NFC RF protocols supported by the first NFC device; and select the NFC RF protocol with the second highest priority when the NFC RF protocol with the second highest priority is one of the plurality of NFC RF protocols supported by the first NFC device.

18. The method according to claim 1, wherein a first NFC RF protocol is a logic link control protocol, wherein a second NFC RF protocol is a NFC data exchange protocol, wherein the first NFC RF protocol is a higher level NFC RF protocol that the second NFC RF protocol, wherein the second NFC RF protocol has a higher priority than the first NFC RF protocol, and wherein the second NFC RF protocol is the selected NFC RF protocol.

19. The method according to claim 1, wherein the computer processor comprises a Device Host (DH).

20. The method according to claim 1, wherein selecting, according to the RF protocol priority information, the selected NFC RF protocol from the one or more NFC RF protocols supported by the second NFC device is performed by the NFCC.

21. The method according to claim 1, wherein obtaining the NFC RF protocol priority information for the plurality of NFC RF protocols supported by the first NFC device comprises reading the NFC RF protocol priority information from a NFC library file.

* * * * *